(12) United States Patent
Hopwood et al.

(10) Patent No.: US 7,267,270 B2
(45) Date of Patent: Sep. 11, 2007

(54) GOODS TRACKING SYSTEM AND METHOD

(75) Inventors: James Hopwood, Poynton (GB); Jon P. Sykes, Bollington (GB)

(73) Assignee: Intellident Limited, Stockport (GB)

( * ) Notice: Subject to any disclaimer, the term of this patent is extended or adjusted under 35 U.S.C. 154(b) by 0 days.

(21) Appl. No.: 11/007,659

(22) Filed: Dec. 8, 2004

(65) Prior Publication Data

US 2005/0139663 A1    Jun. 30, 2005

(30) Foreign Application Priority Data

Dec. 8, 2003    (GB) ................... 0328429.6

(51) Int. Cl.
   *G07B 15/02*    (2006.01)
(52) U.S. Cl. .................. 235/384; 235/375; 705/22; 705/28
(58) Field of Classification Search ........ 235/384–385, 235/454, 462.01, 462.46; 705/20, 28, 22
   See application file for complete search history.

(56) References Cited

U.S. PATENT DOCUMENTS

| | | | | |
|---|---|---|---|---|
| 5,176,224 | A * | 1/1993 | Spector ................. | 186/52 |
| 5,984,182 | A * | 11/1999 | Murrah et al. .......... | 235/383 |
| 6,082,620 | A * | 7/2000 | Bone, Jr. ................ | 235/462.16 |
| 6,669,089 | B2 * | 12/2003 | Cybulski et al. ......... | 235/385 |
| 6,830,181 | B1 * | 12/2004 | Bennett ................. | 235/440 |
| 6,866,195 | B2 * | 3/2005 | Knowles et al. ........ | 235/385 |
| 6,996,538 | B2 * | 2/2006 | Lucas ................... | 705/28 |
| 2001/0027439 | A1 * | 10/2001 | Holtzman et al. ....... | 705/39 |
| 2001/0030232 | A1 * | 10/2001 | Piatek ................... | 235/375 |
| 2001/0041948 | A1 * | 11/2001 | Ross et al. ............. | 700/226 |
| 2002/0183882 | A1 * | 12/2002 | Dearing et al. ......... | 700/115 |
| 2003/0227392 | A1 * | 12/2003 | Ebert et al. ............ | 340/825.49 |
| 2004/0015418 | A1 * | 1/2004 | Dooley et al. .......... | 705/28 |
| 2004/0046020 | A1 * | 3/2004 | Andreasson et al. ..... | 235/385 |
| 2004/0153379 | A1 * | 8/2004 | Joyce et al. ............ | 705/28 |
| 2005/0071234 | A1 * | 3/2005 | Schon .................. | 705/22 |
| 2005/0284934 | A1 * | 12/2005 | Ernesti et al. .......... | 235/385 |
| 2006/0081713 | A1 * | 4/2006 | Carrender ............. | 235/462.46 |
| 2007/0011041 | A1 * | 1/2007 | Bourne ................. | 705/10 |

FOREIGN PATENT DOCUMENTS

| | | |
|---|---|---|
| JP | 2002-240913 A | 8/2002 |
| JP | 2002-347944 A | 12/2002 |
| JP | 2003-327331 A | 11/2003 |

OTHER PUBLICATIONS

United Kingdom Search Report of priority application No. GB 0328429.6.

* cited by examiner

*Primary Examiner*—Daniel Stcyr
*Assistant Examiner*—Edwyn Labaze
(74) *Attorney, Agent, or Firm*—Darby & Darby

(57) ABSTRACT

A goods tracking method and system for tracking goods loaded on or in a carrier is disclosed. The carrier and/or goods have an RFID tag. A data writing device and a data reading device are used. The writing device is arranged to obtain information on the goods and write corresponding data to the carrier's or goods' RFID tag. The reading device is arranged to read data from the RFID tag of the carrier and/or goods being submitted for fulfilment of an order and to determine acceptance of the goods on or in the carrier in dependence on the data meeting requirements of the order.

20 Claims, 3 Drawing Sheets

GOODS TRACKING SYSTEM AND METHOD

Under 35 U.S.C. § 119(a), this application claims the benefit of British Application No. 0328429.6, filed Dec. 8, 2003, which is hereby incorporated by reference in its entirety.

FIELD AND BACKGROUND OF THE INVENTION

The present invention relates to a system and method for tracking goods.

Many suppliers providing goods to retailers, particularly perishable pre-prepared or raw foodstuffs, have moved from providing loaded pallets to using dollys. A dolly is typically a wheeled platform onto which layers of Tray/Case/Outers containing the goods can be placed. In this manner, the Dolly/Pallet can be wheeled directly out into the retailer's store and the goods unloaded onto shelves.

Currently goods/products are stored in containers such as Tray/Case/Outers. The products and containers have bar codes: the product bar code normally contains only the product ID, while the container contains Product UPC/EPC/SKU, Supplier Code and Display Until Date.

One particular issue with any supplier-retailer chain is tracking orders and ensuring that the correct goods are delivered to the correct destination (destination being a consolidation point, distribution depot or retail store). Particularly now that regulations and consumers require fresh produce, it is particularly important that the product is delivered well within its sell-by date & with the correct sell by date displayed. Furthermore, many retailers now have agreements with suppliers that the supplier labels and prices goods at source. If incorrectly labelled or priced goods are received, retailers often reject the goods and charge the supplier.

SUMMARY OF THE INVENTION

According to an aspect of the present invention, there is provided a goods tracking system for tracking goods loaded on or in a carrier, the carrier and/or goods having an RFID tag, the system comprising a data writing device and a data reading device, the writing device being arranged to obtain information on the goods and write corresponding data to the carrier's or goods' RFID tag and the reading device being arranged to read data from the RFID tag of the carrier and/or goods being submitted for fulfilment of an order and to determine acceptance of the goods on or in the carrier in dependence on the data meeting requirements of the order.

Preferably, the system maintains and is used to control all despatches using RFID technology. By control of dispatches using an embodiments of the present invention, despatch/shipping errors should be reduced or removed. Embodiments of the present invention may be implemented to control a whole supply chain to improve despatch at suppliers and receipt at destination to deliver.

The present invention is particularly applicable to systems using RFID reading/writing equipment, but could equally be transferable into the Barcode arena of Data Capture applications. In a preferred embodiment, half multiscanner or mobile multiscanner devices are used. Although RFID technologies are preferred, other writeable or rewriteable memory devices could also be used. In addition, although a mix of barcodes and RFID tags are discussed, systems using purely RFID tags or purely barcodes or other mixes could also be contemplated.

BRIEF DESCRIPTION OF DRAWINGS

Examples of the present invention will now be described in detail with reference to the accompanying drawings, in which.

DETAILED DESCRIPTION OF THE PREFERRED EMBODIMENT

Figure 1:
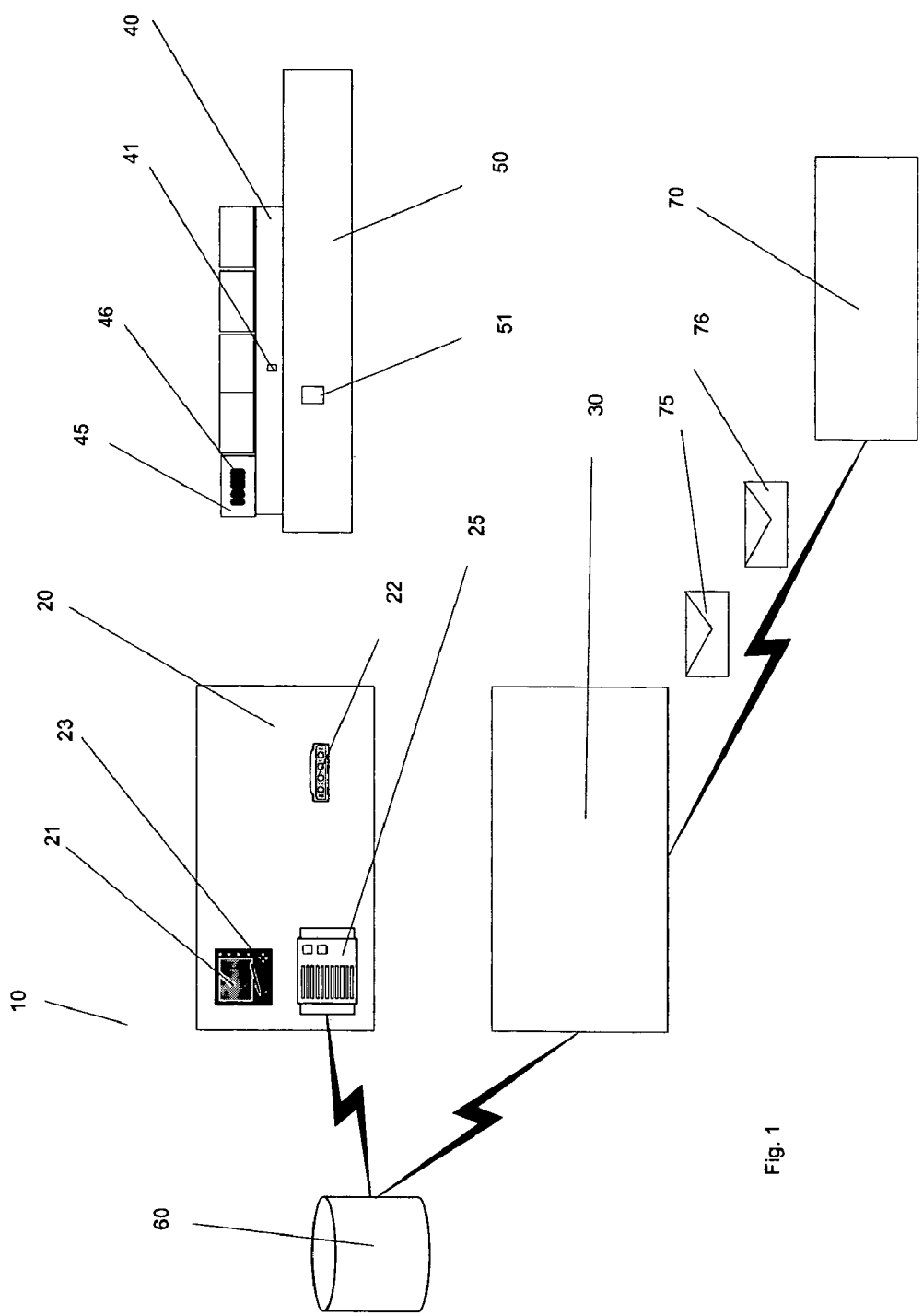
FIG. 1 is a schematic diagram of a system according to an embodiment of the present invention.

The system 10 includes a writing device 20 and a reading device 30. Preferably the reading and writing devices are multiscanners. Although only one reading and one writing device is illustrated, multiple reading & writing devices may be utilised either separately or in a networked/connected manner to allow multiple simultaneous writing & despatching against shared orders for multiple destinations.

Goods are loaded onto a Tray/Case/Outer 40 that are then stacked onto a Dolly/Pallet 50 having an RFID tag or similar rewritable memory device 51. Each goods item 45 has a product description/pricing barcode 46 and optionally a life date (display until date) on its packaging. Each tray 40 includes a barcode or RFID tag 41 describing the goods in the tray.

When the completed Dolly/Pallet stack is presented to the writing device 20, the user is prompted via a screen 21 to scan the barcode on the packaging of the goods in the tray using a scanner 22 and enter the date life, as printed on the package via a touch-screen interface 23. Once this is complete, the operative is asked to scan the tray end label/tag to ensure that the product & label match.

The writing device 20 is arranged to check that the product barcode matches the tray end barcode and displays an error message if this is not so. Additional checks are preferably made to ensure that the product is being dispatched has the correct Display Until Date by use of the Current Date and Lifespan (from a product database 60).

The writing device 20 preferably includes a networked computer system 25 that cross checks the Product Code (as defined by a standard such as UPC/EPC/SKU) from the barcode of each goods item with the product database 60 to ensure the product is correctly labelled.

In a preferred embodiment, the networked computer system also checks the price of the goods on the package to ensure that the package contains the correct price information. This could be done by adding price information to the product database 60 linked to the UPC/EPC/SKU. In this manner, the system can verify that the price is correct prior to entering store. This avoids RTM (Return to Manufacturer) issues. RTM's are a big issue for suppliers because if the packaging is incorrect or if the product is not fit to merchandise 'in-store', retailers reject the product and the supplier has to pay to pick up the product, loses the load payment and receives a loss of profit charge from the retailer.

The writing device 20 then asks for the despatch date, usually today/tomorrow/or the day after to ensure the date life on the tray end label is in tolerance and to ensure that on despatch the tray is sent on the correct delivery wave.

Only once these criteria have been satisfied will the writing device 20 write the required RFID tag 51 labelling the Dolly/Pallet. The RFID tag 51 labelling the Dolly/Pallet includes the UPC/EPC/SKU of the goods, date life and series number (an Individual Supplier Code).

In this manner, the system ensures that the correct product is in the correct tray, labelled correctly and to the correct date life and advertising the right price.

At the reading device 30, tags within Dolly/Pallets are read as they are despatched. The data from the tags is recorded to prove what is being sent and to whom. The reading device 30 collects the UPC/EPC/SKU, Date Life and series number from the Tag and verifies this data against the retailer's order for that day.

Figure 2:
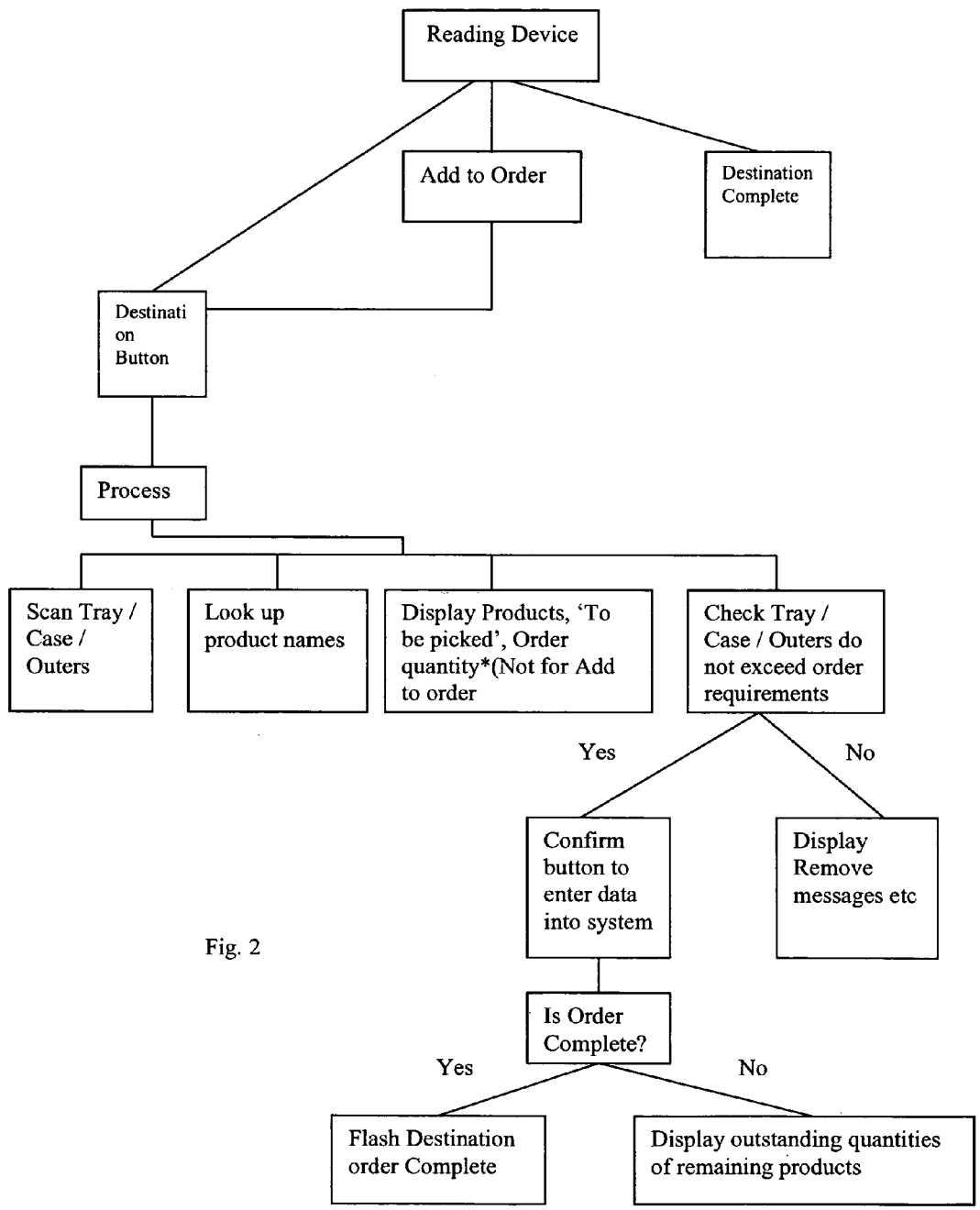
FIG. 2 is a schematic diagram illustrating aspects of a reading device for use in an embodiment according to the present invention; and, FIG. 3 is a schematic diagram illustrating aspects of a reading device for use in an embodiment according to the present invention.
Figure 3:
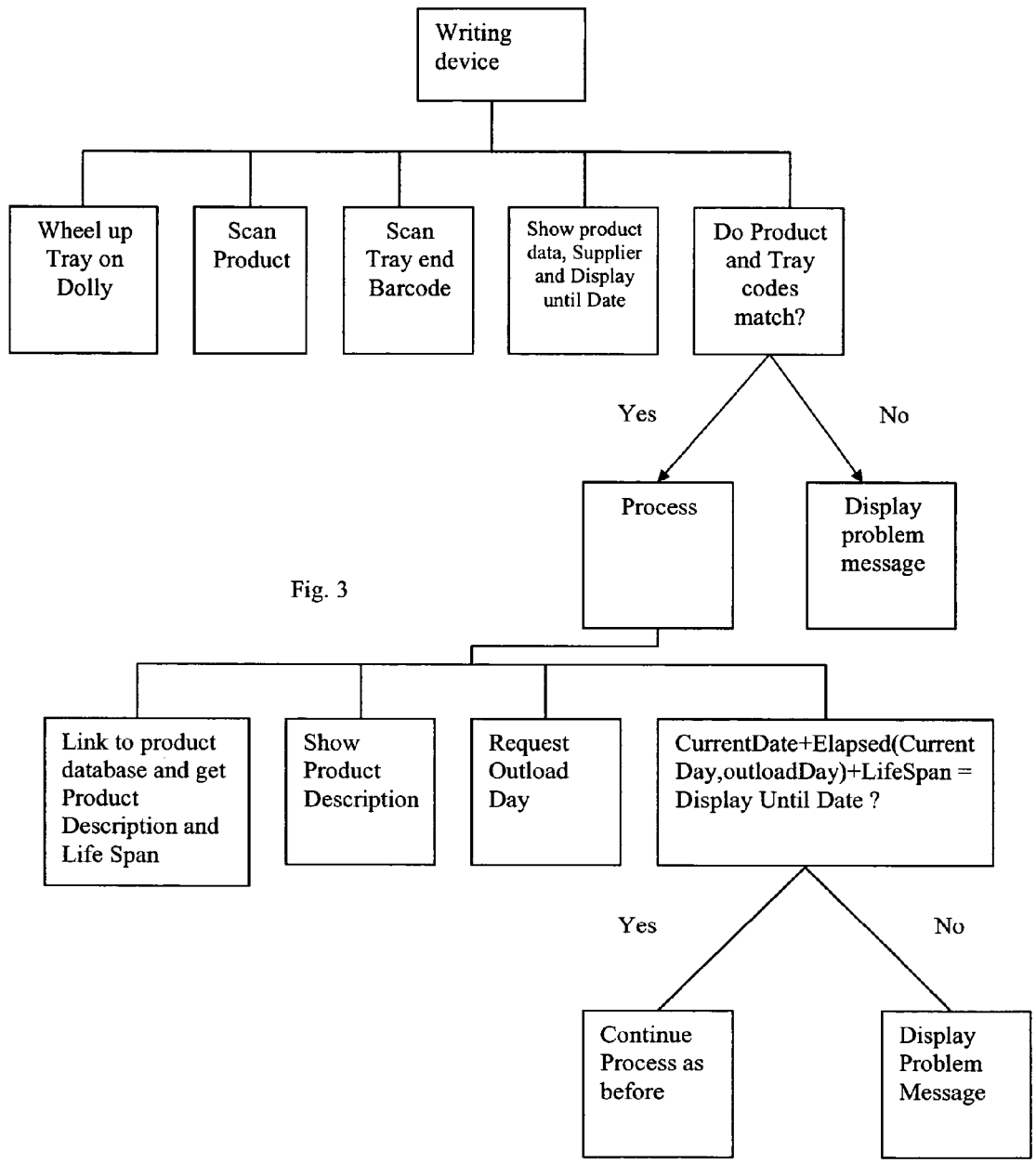

FIGS. 2 and 3 are, respectively, schematic diagrams illustrating aspects of a reading device and a writing device for use in an embodiment according to the present invention.

The dispatch process is as follows:

Once goods have been picked and a Dolly/Pallet stack containing the goods is awaiting despatch, an operative moves the Dolly/Pallet to the reading device for scanning out. Before he is allowed to do this, a screen on the device will ask the operative to select the destination of the Dolly/Pallet stack. He selects the relevant destination (destination being a consolidation point, distribution depot or retail store) and in dependence on the selection, the reading device seeks a file situated on the network that holds the destination's orders for the day. This may be split into an AM or PM delivery wave, and would normally be supplied by the retailer's network. However, the data could equally be supplied by any database system as all that is required is a small file containing Destination, Date, UPC/EPC/SKU, Wave and volume figures. The reading device looks for the latest 'timed' file (as orders can be updated or changed by retailer during the morning) and uploads the data, if necessary according to wave AM or PM in which case the relevant files are prefixed by 'a' or 'p'.

As they are scanned, the individual UPC/EPC/SKUs from the tags are then deducted from the order quantity until the order status is zero, now the order is fulfilled for this destination and this process continues until every destination is complete. In this manner, the system ensures the correct volume of goods being delivered to the correct destination, even if the order has been updated.

The operative can then selects the wave (AM/PM) to ensure that the date is correct and the reading device reads the data off the tag and uploads the new volume figures. This ensures the tolerance date life is appropriate and the goods are despatched on right day, so Sunday's delivery is sent PM Saturday and not AM Friday for example.

Once an order for a destination is complete, the reading device provides the despatch office 70 with a copy of the vehicle manifest 75 and delivery note 76 ready for the driver. Preferably, the data is provided via email or some other electronic alert or report. The data is in a form that can be produced as a paper document to satisfy legacy systems and authorities should it be needed. This expedites despatch as the gatehouse receives the manifest of the vehicle to prepare the destination of the delivery before the lorry even leaves the site. This provides a rapid information flow as there is a reduced paper trail. It also provides a failsafe mechanism to ensure orders are 100% complete; the supplier now cannot deliver a short or an over order to a destination.

Reporting facilities are available on screen for pickers to track their progress. For example, after a break they can go to the reading device and call up orders remaining to complete. This removes human error, such as poor concentration and distractions, and means picking sheets, which are manually completed and usually out of date, are not needed.

In a preferred embodiment, the RFID tag of a Dolly/Pallet also includes data on a trail to the destination and the date at which the Dolly/Pallet went into further destinations.

The system preferably provides a supervisor mode to allow redistribution of stock. For example, one supplier may have made too few products to fulfil an order. In this case it is preferable to redistribute goods with the appropriate UPC/EPC/SKU across the destinations giving them all a slight shortage instead of one destination having a substantial short. Using the supervisor mode, a multiscanner device can instruct the network to redistribute the stock and the pick quantity is reduced across the destination network.

It is also possible using supervisor mode to add an additional product that is not contained in the order. For example, a supplier may have to redistribute stock for the reasons above. In this situation, the retailer may call the supplier and ask if they can supply the shortfall. Since the order does not appear on the multiscanner device, an 'add local' option can be invoked at the destination which enables the supplier to deliver UPC/EPC/SKU's outside of the destinations requested order.

All of a day's transactions are recorded on a local or centrally served database for reporting purposes. This data can be used to ensure that if their ever is a discrepancy on delivery volume against an order the supplier can quickly call up that day's delivery and provide definitive proof that an order was fulfilled or not, as the case my be. This removes the time consuming searching through historical paperwork to address an inconsistency.

| Area | Reason | Benefit |
|---|---|---|
| Writing Multiscanner device | | |
| Checking "Display until" date on pack | Ensures that the pack has the correct printed dispatch date | Avoids fines for incorrect product |
| Comparison of product label and tray end barcode | Ensures that the product is in the correct tray | Avoids fines for incorrect product |
| Checking dispatch day against "display until" date on the label and the date life | Ensures that the product has the correct dispatch day | Avoids fines for incorrect product display until date |
| Checking the number of tags in a stack against the number entered on screen | Ensures the correct number of Tray/Case/Outers are passed into cold store/Storage | Avoids unaccounted for stock |
| Communication with product database | Gets product names and shelf life's | Allows the system to check dispatch date and display name of product |
| Reading Multiscanner device | | |
| Checking tray count | Checking for good RFID tags and that the correct number of Tray/Case/Outers is entered into the system | Avoids bad tags on dispatched stock and ensures the system has the correct quantity of dispatched stock |
| Repeat Tray/Case/Outers checking | Checks that Tray/Case/Outers can only be processed once during each 24 hour period | Prevents the same Tray/Case/Outers from being processed a number of times and therefore avoids fines for incorrect quantity of product |
| Destination and wave selection | Allows the refining of products into the correct number for individual destinations | Avoids fines for incorrect quantity of product |
| On screen report | Displays details of | Allows packers select |

-continued

| Area | Reason | Benefit |
| --- | --- | --- |
| | outstanding products after each tray has been accepted | the outstanding product |
| Addition of local product | Allows local entry of products with UPC/ EPC/SKU code and name | Allows the system to operate off line and process products that are not yet in the database/order system etc |
| Network Link | Get order information and updates to orders | Allows the system to process the correct number of Tray/Case/ Outers for a particular destination |
| Destination Complete | Allows all products for a particular destination to be marked as complete | Allows an order to be dispatched immediately |
| Destination Complete outstanding orders report | Displays the outstanding products and quantities that will be marked as complete | Shows what will happen to stock levels if this action continues |
| Redistribute | Allows movement of products between destinations as priorities dictate | Allows orders to be completed for given destination from already packed stock. |
| Checking of Database/Order system for updates | Any destination transaction needs to have the latest product quantities | Avoids fines for incorrect product |

In a preferred embodiment, the management functionality of the system can be enhanced to display the status of an order before asking for confirmation of and enacting the request.

This allows an order to be shipped even if incomplete. This is accomplished by selecting a Destination, Wave and Date. In this manner, the status displayed will be either
Complete
Incomplete, and the outstanding quantities required Example of Incomplete Destination

| Product Description | Picked | Order | Variance |
| --- | --- | --- | --- |
| Granny Smith | 1 | 60 | 59 |

To avoid the same tags being used to "complete" different, or even the same order more than once, each tag identifier is saved to a database. If a tag is presented to the reading device more than once within a day then an error message will be displayed. Obviously the time period can be lengthened or shortened as is needed when configuring the system.

Where a product does not match the tray end barcode and the dispatch date does not match the tray end barcode dispatch date, an error message indicating both failures are displayed.

Where products are removed from an order, the quantity is not reduced in the next order file, even though the actual product line is missing. Since an update to the database is made from this file and no new quantity exists for the product, the quantity is set to zero.

In a preferred embodiment, the system is arranged to check that a product being dispatched is not only the product that matches the tray end label but is also the product with the correct date. Since the date in not encoded on the product bar code, a dialog is presented with the numbers 1 to 31. The operative can then enter a number from the dialog that represents the product display date.

This is used to check that the entered numbers matches the day number of the Display Until Date from the label. If this check fails the process will be halted and an error message displayed.

In a preferred embodiment, the process performed at the writing device is as follows: (this assumes the preferred case in which all products on a Dolly/Pallet are the same)
Wheel up a Dolly/Pallet containing Tray/Case/Outers to the multiscanner device
Display shows 'Scan Product'
Scan Product Barcode. ProductBarcode.
Display shows 'Enter Dispatch Day' and a entry box with date number entry appears.
The user selects a number
Screen shows 'Scan Tray end Label'
Scan the Tray end label TrayEndLabelBarcode
Tray End Label Barcode separated into ProductUPC/EPC/SKU, SupplierCode and DisplayDate
Check that the entered Display Day matches the display day from the entered tray end label, Display the error message "Incorrect Date on product" if this check fails.
Ensure that ProductBarcode=UPC/EPC/SKU else display 'Incorrect Tray End Label'
Link to product Database. Get product names and LifeSpan.
Show a new screen with Product Description and request Outload Day
User Selects Outload Day from touch screen. Days will be listed as 'TODAY' followed by each day in turn.
Ensure CurrentDate+ElapsedDays (CurrentDay, OutLoad Day)+LifeSpan=
Display Until Date
Enter tray Count and select between single or double Dolly/Pallet
Check the correct number of Tray/Case Outers are on the Dolly/Pallet
Program RFID Tags
For a double Dolly/Pallet, the system is arranged to display a prompt to position reverse of the Dolly/Pallet, and then proceeds substantially as above.

In another embodiment, the process performed at the writing device is as follows: (this assumes the preferred case in which all products on a Dolly/Pallet are the same)
Wheel up a Dolly/Pallet containing Tray/Case/Outers to the multiscanner device
Change display screen To Show 'Scan Product'
Scan Product Barcode. ProductBarcode.
Change display screen to show 'Scan Tray end Label'
Scan the Tray end label TrayEndLabelBarcode
Tray End Label Barcode separated into ProductUPC/EPC/SKU, SupplierCode and DisplayDate
Ensure that ProductBarcode=UPC/EPC/SKU else display 'Incorrect Tray End Label'
Link to Database. Get product names and LifeSpan.
Show a new screen with Product Description and request Outload Day
User Selects Outload Day from touch screen. Days will be listed as 'TODAY' followed by each day in turn.
Ensure CurrentDate+ElapsedDays(CurrentDay, OutLoad Day)+LifeSpan=
Display Until Date
Enter tray Count and select between single or double Dolly/Pallet
Check the correct number of Tray/Case/Outers are on the Dolly/Pallet Program Tags For double Dolly/Pallet, display 'Position reverse of Dolly/ Pallet', enter number of Tray/Case/Outers and program At the reading device, dollies can have a mix of products. In a preferred embodiment, the process performed at the reading device is as follows:

Check database for the latest order details.

Select destination button and select from the list on screen.

Select Either

Supervisor Menu accessible via a 3 digit pin code providing

Add functionality to add products that are not in database

Redistribute functionality, which would read product into a different destination. Select FROM destination, Select number of Tray/Case/Outers, Select TO destination. Select 'Confirm'

Destination Complete (meaning the order has been manually completed)

Or proceed as normal (step 'd')

Scan the Dolly/Pallet and look up the product names from the order database data, The link being in the UPC/EPC/ SKU code Display the current screen until the correct number of Tray/Case/Outers is detected and then display the totals screen Display the contents of the Dolly/Pallet (Product, Picked, Order, 'On This Dolly/Pallet') of Tray/Case/Outers Excess Tray/Case/Outers would be flagged, "Remove Excess Tray of <Description> re-scan" as well as 'Product <Description> order already complete. Please "remove tray(s) and scan again"

User selects "Confirmed" button and data is entered into the system.

Display now shows outstanding quantity of products on order for the selected destination or When no further items are required the system should flash "destination order complete"

An email containing details of the report will be dispatched for all orders completed Order Database Files from Order Database Preferably have the Format:

Filename:
   YYMMDDIWaveIVersion.csv

Where:

YYMMDD represents the date

Wave is either AM or PM

Version is an updated version number from 0 to 9 with 0 being the first version of the order Example 030521A0.csv, being an AM order for 21/05/03 version 1

Contents:
OrderNumber, Branch, UPC/EPC/SKU, ProductName, Quantity

Example
1234, BAR, 12345678, ISRAELI APRICOTS 10×6 MS, 3 repeated for each destination.

Reports

Various reports can be generated via a screen at the reading device. In addition, reports may be emailed at the point orders are complete. Reports may have a format:

Destination #0637 Date: 23/4/2003 Wave: One

| Product Description | Picked | Order | Variance |
|---|---|---|---|
| Granny Smith | 1 | 60 | 59 |
| Golden del | 3 | 60 | 57 |

Destination #0637 Date: 23/4/2003 Wave: One

| Product Description | Picked | Order | Variance |
|---|---|---|---|
| Granny Smith | 1 | 60 | 59 |
| Golden del | 3 | 60 | 57 |

Preferably, the reports have an HTML format, viewable in a Web browser such a Microsoft Internet Explorer (RTM).

Another report format available shows the status of orders following the selection of the following:

Destination

Date

Wave

Example

Destination #0637 Date: 23/4/2003 Wave: One

| Product Description | To be picked | Order | Variance |
|---|---|---|---|
| Granny Smith | 1 | 60 | |
| Golden del | 0 | 60 | |

The invention claimed is:

1. A goods tracking system for tracking goods loaded on or in a carrier, the carrier and/or goods having an RFID tag, the system comprising a data writing device and a data reading device, the writing device including a barcode scanner and being arranged to obtain information from the goods and write corresponding data to the carrier's or good's RFID tag and the reading device being arranged to read data from the RFID tag of the carrier and/or goods being submitted for fulfilment of an order and determine acceptance of the goods on or in the carrier in dependence on the data meeting requirements of the order.

2. A system according to claim 1, wherein the data writing device is arranged to access a database to obtain the corresponding data in dependence on the goods' barcode.

3. A system according to claim 1, wherein the writing device is arranged to obtain data on the life of the goods and to reject goods having a life expiring before a predetermined point in time.

4. A system according to claim 1, further comprising an order database, wherein the reading device is arranged to access the order database to determine acceptance of the goods submitted for a respective order.

5. A system according to claim 1, wherein data is written to tags during fulfilment of an order to create an audit trail for tracking said goods and said order.

6. A system according to claim 1, wherein upon fulfilment of an order, the system being arranged to transmit data on the order to one or more destinations to facilitate despatch.

7. A system according to claim 6, wherein the data transmitted includes one or more of a delivery note, a goods manifest and a despatch notice.

8. A goods tracking system for tracking goods loaded on or in a carrier, the carrier and/or goods having an RFID tag, the system comprising: a data writing device and a data reading device, the writing device including a barcode scanner and being arranged to obtain information from the goods and write corresponding data to the carrier's or goods' RFID tag and the reading device being arranged to read data from the RFID tag of the carrier and/or goods being submitted for fulfillment of an order and to determine acceptance of the goods on or in the carrier in dependence on the data meeting requirements of the order; and an order database, wherein the reading device is further arranged to access the order database to determine acceptance of the goods submitted for a respective order, wherein upon acceptance of goods, the reading device is arranged to upate the order database to decrement the respective goods required to fulfill the order.

9. A system according to claim 8, wherein upon acceptance of goods, the reading device is arranged to record data on tags associated with the goods, the system being to cross reference data recorded on accepted tags to prevent repeated presentation of the goods to fulfil the same or another order.

10. A goods tracking system for tracking goods loaded on or in a carrier, the carrier and/or goods having an RFID tag, the system comprising a data writing device and a data reading device;
the writing device including a barcode scanner and being arranged to obtain information on the goods from a database in dependence on a goods' barcode and write corresponding data to the carrier's or goods' RFID tag;
the reading device being arranged to read data from the RFID tag of the carrier and/or goods being submitted for fulfilment of an order and to determine acceptance of the goods on or in the carrier in dependence on the data meeting requirements of the order as defined in an order database,
wherein upon acceptance of goods, the reading device is arranged to update the order database to decrement the respective goods required to fulfil the order and to record data on tags associated with the goods, the system being to cross reference data recorded on accepted tags to prevent repeated presentation of the goods to fulfil the same or another order.

11. A method for tracking goods loaded on or in a carrier comprising: including an RFID tag on the carrier and/or goods; obtaining information from the goods using a barcode scanner and writing corresponding data to the carrier's or goods' RFID tag; reading data from the RFID tag of the carier and/or goods being submitted for fulfilment of an order; and, determining acceptance of the goods on or in the carrier in dependence on the data meeting requirements of the order.

12. A method according to claim 11, wherein the step of obtaining information includes the step of reading a goods' barcode using the barcode scanner and obtaining information on the goods in dependence on a goods' barcode.

13. A method according to claim 12, further comprising accessing a database to obtain data in dependence on the goods' barcode.

14. A method according to claim 11, wherein the step of obtaining information includes the step of obtaining data on the life of the goods and to reject goods having a life expiring before a predetermined point in time.

15. A method according to claim 11, wherein the step of determining acceptance of goods further comprises accessing an order database to determine acceptance of the goods submitted for a respective order.

16. A method according to claim 11, further comprising writing data to goods' tags during fulfilment of an order to create an audit trail for tracking said goods and said order.

17. A method according to claim 11, further comprising, upon fulfilment of an order, transmitting data on the order to one or more destinations to facilitate despatch.

18. A method for tracking goods loaded on or in a carrier comprising;
including an RFID tag on the carrier and/or goods;
obtaining information from the goods and writing corresponding data to the carrier's or goods' RFID tag;
reading data from the RFID tag of the carier and/or goods being submitted for fulfillment of an order; and,
determining acceptance of the goods on or in the carrier in dependence on the data meeting requirements of the order, wherein the step of determining acceptance of the goods submitted for a respective order,
wherein upon acceptance of goods, the method further comprising updating the order database to decrement the respective goods required to fulfill the order.

19. A method according to claim 18, wherein upon acceptance of goods, the method further comprising recording data on tags associated with the goods, the step of determining acceptance of goods further comprising cross referencing data recorded on accepted tags to prevent repeated presentation of the goods to fulfil the same or another order.

20. A goods tracking system for tracking goods loaded on or in a carrier for a selected destination, the carrier and/or goods having an RFID tag, the system comprising:
a file storage device containing an order for the selected destination;
a data writing device arranged to obtain information from goods in fulfillment of the order which have been loaded on or in the carrier and write corresponding data to the carrier's or goods' RFID tag;
a data reading device in communication with the file storage device and arranged to read data from the RFID tag of the carrier and/or goods being submitted in fulfillment of the order for the selected destination, to verify the read data against the file in the file storage device concerning the order by the selected destination, and to determine a fulfillment of the order in dependence on the read data meeting the requirements of the order; and
an output associated with the reader and being responsive to the fulfillment determination to identify whether the order for the selected destination is complete and, if not complete, to identify outstanding quantities of any remaining goods.

* * * * *